United States Patent Office 2,874,061
Patented Feb. 17, 1959

2,874,061

WAXES SUITABLE FOR SELF-POLISHING AQUEOUS EMULSIONS

Helmut Kolling, Duisburg-Hamborn, and Friedrich Rappen, Oberhausen-Sterkrade, Germany, assignors to Ruhrchemie Aktiengesellschaft, Oberhausen-Holten, Germany No Drawing. Application July 24, 1956
Serial No. 599,685

Claims priority, application Germany July 26, 1955

20 Claims. (Cl. 106—10)

This invention relates to waxes for self-polishing, aqueous emulsions.

Dispersions or emulsions of wax in water, which may be spread upon a surface, and which, upon drying, will leave a high-gloss wax coating without buffing or polishing, are known. These aqueous dispersions or emulsions are referred to as self-polishing waxes. The main advantage of these aqueous, self-polishing compositions resides in the fact that the same may be used to form a high-gloss coating without the labor involved in buffing and polishing. Additionally, since water is the only solvent used, the cost of a solvent is saved, and the danger of fire is eliminated.

As may be noted from the literature of the art (see, for example, "Seife, Oele, Fette, Wachse," No. 26, pages 637 et seq., 1952), wax used for the production of self-polishing, aqueous emulsions must fulfill a number of requirements. It must have a certain degree of hardness, be of a light color, and be capable of being easily converted into stable emulsions. Furthermore, the wax should be odorless, as the wax odor is considered objectionable during and after application.

The above requirements, as may be noted from the cited reference, have thus far only been met by waxes of a natural origin, such as carnauba wax, ouricury wax, and wax products derived from crude montan wax, which are only available in limited quantities, and which are relatively expensive.

Thus far it has not been possible to use the readily available and inexpensive paraffins obtained from petroleum refining or catalytic carbon monoxide hydrogenation or waxes derived therefrom for this purpose.

While it has been proposed to produce high-molecular wax-like products from the readily available paraffin hydrocarbons having more than 25, and preferably more than 30 carbon atoms in their molecule, and preferably those obtained in catalytic carbon monoxide hydrogenation by chlorinating the paraffin, so as to add not more than 1 gram atom of chlorine per mol of hydrocarbon, splitting off hydrogen chloride by pyro-dehydrochlorination to convert the chlorination products into olefin-containing hydrocarbon mixtures, converting the latter by means of an oxo-synthesis and subsequent hydrogenation into mixtures of alcohols and hydrocarbons, and converting this mixture by subsequent treatment with molten alkali and with mineral acids into mixtures of carboxylic acids and hydrocarbons, these wax-like products are completely unsatisfactory for the preparation of self-polishing aqueous emulsions, though the same are well suited to the preparation of solid floor polishes, shoe polishes, and other leather dressings, and for paper impregnation and similar uses. When these wax materials are formed into aqueous emulsions, they develop considerable deposits at the brim and at the bottom, particularly when subjected to elevated temperatures. Similar, or even still worse results are obtained if the process mentioned above is applied to paraffins of a different molecular size.

One object of this invention is the conversion of higher paraffins, such as the so-called hard paraffins obtained from the Fischer-Tropsch synthesis and similar catalytic carbon monoxide hydrogenation reactions into a wax product which is suitable for the production of aqueous, self-polishing emulsions. This, and still further objects, will become apparent from the following description:

In accordance with the invention, it has been discovered that if the above-recited process is applied to starting paraffins having a molecular size of above $C_{30}$, and preferably an average molecular size of $C_{40}$–$C_{50}$ with the chlorination being effected so that 1.5–4 gram atoms, and preferably 1.7–2.2 gram atoms of chlorine are added per mol of hydrocarbon, and if 20–80% and preferably 30–50% of the wax acids of the wax acid-hydrocarbon mixture are saponified with potassium hydroxide, sodium hydroxide, potassium carbonate or sodium carbonate, a wax product is obtained which is excellently suited for the production of self-polishing, aqueous emulsions.

The wax product contains free wax acids, alkali soaps of these acids, and paraffin, generally present in a minor quantity.

Prior to the saponification, a portion, as for example 10–50% of the free wax acids may be esterified with an alcohol such as a polyhydroxy alcohol, as, for example, a glycol, such as ethylene glycol or butyl glycol. In this case, the product additionally contains the wax esters.

The starting paraffins must have a molecular size above $C_{30}$, and if paraffins of a lower number of carbon atoms in the molecule are used, waxes which are satisfactory for the production of self-polishing, aqueous emulsions will not be obtained. As mentioned, the paraffins are preferably the so-called hard paraffins from the Fischer-Tropsch synthesis which advantageously contain an average number of carbon atoms between $C_{40}$ and $C_{50}$. These starting high-molecular paraffins are inexpensive and readily available in unlimited quantity from, for example, suitable crude oil fractions, in addition to the synthesis products from the catalytic hydrogenation of carbon monoxide.

The individual reaction steps of the process in accordance with the invention are extremely well known in the art and have been described in the literature. The chlorination is effected in the extremely well-known and conventional manner, but must be so effected that only between 1.5 and 4 gram atoms and preferably 1.7 to 2.2 gram atoms of chlorine are added per mol of hydrocarbon. When operating outside of this range, a wax product which is suitable for the formation of a self-polishing aqueous emulsion is not obtained. In detail, the chlorination is effected by introducing gaseous chlorine into the paraffins which are at temperatures of about 15–20° C. in excess of their melting point while constantly stirring.

The conversion of the chlorinated paraffins to the corresponding olefins is effected in the conventional, well-known manner by a dehydrochlorination reaction with the splitting-off of hydrogen chloride. This is generally effected at temperatures of about 300° C. in a vessel with stirrer. During the reaction, small amounts of nitrogen are passed through. The total reaction time in the dehydrochlorination is 6–10 hours. Sometimes, it is of advantage to effect the dehydrochlorination in the presence of 1–2% by weight of activated charcoal.

The conversion of the olefins in the mixture obtained from the dehydrochlorination into aldehydes is effected by the extremely well-known oxo synthesis, in which carbon monoxide and hydrogen, as, for example, in the form of a water gas mixture, is catalytically added to the olefins under conditions of elevated temperature and pressure, using the conventional cobalt compounds or metallic cobalt as catalysts. Use may be made, for example, of a catalyst which consists of 200 parts by weight of kieselguhr, 100 parts by weight of cobalt and 15 parts by weight of magnesia. Cobalt carbonyl compounds may also be used as the catalyst. During the catalytic addition of water gas, the reaction temperature is maintained at 140–160° C. The reaction pressures range between 100 and 200 kilograms per square centimeter.

The aldehydes obtained from the oxo-synthesis are converted in the conventional manner into the corresponding alcohols by a hydrogenation which may, for example, be effected by contacting the aldehydes with hydrogen at elevated temperatures of 150–220° C. and pressures of 50–200 kg./sq. cm., using the same catalyst used for the preceding oxo-synthesis or a conventional hydrogenation catalyst, as, for example, a nickel catalyst. After the termination of the hydrogenation, the catalyst is separated from the reaction product by filtration.

The alcohols in the mixture obtained from the hydrogenation are then converted into the corresponding acids. This is accomplished by treating the mixture for 5–10 hours with molten alkali at 300–350° C., using 100–150% of the theoretically required quantity of sodium hydroxide or potassium hydroxide. The reaction mixture thereby obtained is mixed with, for example, dilute sulfuric acid while constantly stirring. By repeated boiling with water, the reaction product is freed from residual acid and then dried in the conventional manner.

20–80%, and preferably 30–50% of the wax acids, are then saponified with potassium hydroxide, sodium hydroxide, potassium carbonate or sodium carbonate. If less than the amount specified of the acids is saponified, the self-gloss emulsions obtained from the wax product formed will settle out or form deposits at the upper brim of the liquid. If more than 80% of the wax acid is saponified, the molten waxes have too high a viscosity, which makes their processing into the emulsions extremely difficult or impossible.

If a portion of the wax acids is esterified with an alcohol prior to the saponification, the esterification reaction is effected in the conventional and well-known manner, using ethylene glycol or butylene glycol. The reaction conditions applied may be seen from Example 2.

The self-polishing aqueous emulsions are formed from the wax product produced in accordance with the invention in the identical manner that the same were produced from the waxes of natural origin, as, for example, by maintaining wax products in molten form with the addition of an emulsifying agent and slowly adding the water and stirring the same until the mixture is cooled. The emulsifiers, which may be used are the conventional ionogenic, or non-ionogenic emulsifiers as being known to those skilled in the art of making wax products. Examples of well suited emulsifiers are the V2096E emulsifier produced by Chemische Werke Huels and the emulsifier produced by Badische Anilin- und Soda-Fabrik A.-G. under the trade name of "Emulphor O." The amount of wax in the self-polishing aqueous emulsions is generally 10–15%.

Resins, as, for example, shellac, may be added to the emulsions in the conventional manner. Instead of shellac, other resins which are usual for this purpose, as, for example, the Durez resins produced by the Durez Plastics & Chemical Inc., New York, N. Y., may also be used for the production of the self-polishing emulsions. The compatibility of the resins with the waxes in accordance with the invention is excellent, and, for example, no difficulty is encountered in mixing the same with aqueous shellac solutions.

The waxes in accordance with the invention are extremely easy to emulsify, and the self-polishing emulsions prepared therefrom are extremely stable and do not develop deposits, either at their upper brim or at their bottom on standing for prolonged periods of time, even at elevated temperature. Moreover, the emulsions are thinly liquid, so as to permit easy spraying. The emulsions are additionally practically neutral.

The waxes in accordance with the invention, and thus the coatings formed from the self-polishing emulsions, have a very high degree of hardness. The penetration numbers obtained at 25° C. generally range below 1. The film formed from the emulsion is extremely hard and has a very high gloss without polishing. The color of the wax as produced in accordance with the invention is light yellow, and thus the self-polishing emulsions prepared therefrom are light in color. The waxes are practically free from odor, even after preparation of a coating from the self-polishing emulsions.

In connection herewith, it may be pointed out that the preparation of the self-polishing emulsions is not within the scope of the invention which remains limited to the preparation of the waxes required for said emulsions. The preparation of aqueous self-polishing emulsions is substantially effected in the same manner in which the waxes which are being marketed but which are not particularly well usable are processed to self-polishing emulsions.

The following examples are given by way of illustration and not limitation:

*Example 1*

(a) Hard paraffin obtained by the catalytic hydrogenation of carbon monoxide, containing all of the hydrocarbons boiling above about 450° C. and having an average number of carbon atoms of 45 was chlorinated until 11.2% of chlorine had been absorbed. The chlorination mixture to which 1% of activated carbon was added was heated for 8 hours at 300° C. while stirring and passing through small amounts of nitrogen. After having removed the solid constituents by filtration, a product was obtained which had an iodine number of 42.

The olefinic hydrocarbon mixture was treated with water gas for 1 hour in a pressure vessel provided with a stirrer at 140–160° C. and a pressure of 180–200 kg./sq. cm., using a cobalt catalyst. This cobalt catalyst consisted of 200 parts by weight of kieselguhr, 100 parts by weight of cobalt and 15 parts by weight of magnesia. The aldehydes thereby formed were subsequently hydrogenated with hydrogen for 1 hour at 180–200° C. and a pressure of 140–150 kg./sq. cm., using the same cobalt catalyst. After having filtered off the catalyst, a faintly yellowish product containing 85% of alcohols was obtained.

The alcohol-paraffin mixture thus obtained was mixed with 130% of the quantity theoretically required of caustic potash and stirred in a pressure vessel for 6 hours at 350° C. Thereafter, the reaction product was decomposed with dilute hydrochloric acid. Following this, it was repeatedly boiled out with water to remove the last residues of mineral acid. After drying, there remained a light yellow wax acid-paraffin mixture which contained 85% of wax acids. It was stirred at 100–140° C. with the addition of small amounts of sodium hydroxide solution until the content of free acids had decreased to 45%. The finished product thus produced cotained 15% of paraffin, 45% of free wax acids, and 40% of sodium soaps. It had a dropping point of 97° C. and a penetration number of 0.6 at 25° C. The penetration number was determined according to the ASTM specification D–5 with the total load being 100 gms., the temperature being 25° C. and the measuring time 5 seconds.

(b) A self-polishing emulsion was prepared in the following manner from 13.0 parts by weight of the wax prepared in accordance with Example 1(a), 2.6 parts by weight of oleic acid, 1.6 parts by weight of triethanolamine, and 82.8 parts by weight of water.

The wax, together with the oleic acid, was melted at 100–110° C. The triethanolamine was added to the melt while slowly stirring, and the stirring was continued until the melt was clear and liquid. The temperature of the melt was brought to 100° C., and then the boiling water was added first in small portions, and then in gradually increasing portions. The next portion of water was not added until the preceding one had been completely absorbed and a homogeneous mass had formed. As soon as a thinly liquid emulsion had ben obtained, the remainder of the water was added without interruption. The emulsion was allowed to cool while moderately stirring, and the evaporated water was replaced at room temperature.

In this manner there was obtained a thinly liquid and finely dispersed self-polishing emulsion which was of beige color, free from odor, and had good self-polishing characteristics. The emulsion, which had a pH value of 7.3, was very stable. After standing for 10 days at room temperature it had not settled nor had it developed deposits at the bottom or at the upper brim of the liquid. Moreover, the emulsion was extremely temperature-resistant. Upon standing for 24 hours at 40° C. it had not settled and had retained its structure.

(c) A self-polishing emulsion was prepared in the following manner from 10.0 parts by weight of the wax produced according to Example 1(a), 1.5 parts by weight of emulsifier V2096E (an addition product of a polyethylene oxide and a fatty alcohol having a chain length of 16 to 18 carbon atoms produced by Chemische Werke Huels), and 88.5 parts by weight of water.

The wax, together with the emulsifier, was melted at 100–110° C. The melt was brought to a temperature of 100° C., and then the boiling water was first added in small portions and later in larger portions while thoroughly stirring. The next portion of water was not added until complete homogenization was obtained. As soon as a thinly liquid emulsion was obtained, the remainder of the water was added without interruption. The emulsion was stirred until it was cold and then the evaporated water was replaced at room temperature.

In this manner there was obtained a milky-white, odorless, thinly liquid and finely dispersed self-polishing emulsion with good self-polishing characteristics. The emulsion, which had a pH value of 7.2, was very stable. When stored at room temperature and at 40° C., it showed the same behavior as that of the emulsion according to Example 1(b).

(d) A self-polishing emulsion was prepared in the manner described in Example 1(c) from 10.0 parts by weight of the wax produced according to Example 1(a), 1.5 parts by weight of V2096E emulsifier, an addition product of a polyethylene oxide and a fatty alcohol having a chain length of 16 to 18 carbon atoms and 88.5 parts by weight of water.

The cold emulsion was mixed with 15% of a cold shellac solution comprising 11.8 parts by weight of dewaxed shellac, 87.0 parts by weight of water, and 1.2 parts by weight of 26% ammonia.

This shellac solution had been prepared by first dissolving the shellac in about half the amount of water and the ammonia, adding the remainder of the water after the dissolution of the shellac, and subsequently filtering the solution.

The self-polishing emulsion obtained by the admixture of the shellac solution was thinly liquid and finely dispersed. Its pH value was 8.1. When standing at room temperature and at 40° C., the emulsion showed the same behavior as that of the emulsion according to Example 1(b).

Example 2

The wax acid-paraffin mixture prepared according to Example 1(a) was esterified with butylene glycol at temperatures of 110–120° C., using p-toluene sulfonic acid. The reaction product contained 15% of paraffin, 30% of esters, and 55% of free wax acids. It was stirred while adding small amounts of sodium hydroxide solution until the content of free wax acids had decreased to 20%. The finished product thus prepared contained 15% of paraffin, 30% of esters, 35% of sodium soaps, and 20% of free wax acids.

From this wax, self-polishing emulsions were prepared in the manner described in Examples 1(b) and 1(c). There were obtained beige or milky-white, thinly-liquid, finely-dispersed, odorless, and stable self-polishing emulsions having good self-polishing characteristics. Their pH values ranged between 7.0 and 7.4. When standing at room temperature and at 40° C. they showed the same behavior as that of the self-polishing emulsion according to Example 1(b).

We claim:

1. A wax suitable for the production of self-polishing aqueous emulsions consisting essentially of a mixture of free wax acids, alkali soaps thereof and paraffin formed by chlorinating a paraffin having a molecular size above about $C_{30}$ with the addition of 1.5–4 gram atoms of chlorine per mol of hydrocarbon, dehydrochlorinating the chlorinated product to form olefins, converting the olefins to aldehydes by the oxosynthesis, hydrogenating the aldehydes to alcohols, forming wax acids from the alcohols by treatment with molten alkali, and saponifying 20–80% of the wax acid with a member selected from the group consisting of potassium hydroxide, sodium hydroxide, potassium carbonate and sodium carbonate.

2. Wax according to claim 1, in which said paraffin has a molecular size between about $C_{40}$ and $C_{50}$.

3. Wax according to claim 1, in which said paraffin is a hard paraffin obtained by the catalytic hydrogenation of carbon monoxide.

4. Wax according to claim 1, in which the chlorination is effected with the addition of 1.7–2.2 gram atoms of chlorine per mol of hydrocarbon.

5. Wax according to claim 1, in which about 30–50% of the wax acid is saponified.

6. Wax according to claim 1, in which said paraffin is a hard paraffin obtained from the catalytic hydrogenation of carbon monoxide having a molecular size between about $C_{40}$ and $C_{50}$, said chlorination being effected with the addition of 1.7–2.2 gram atoms of chlorine per mol of hydrocarbon, and in which 30–50% of said wax acid is saponified.

7. A wax suitable for the production of self-polishing aqueous emulsions consisting essentially of a mixture of free wax acids, alkali soaps, and esters thereof, and paraffin formed by chlorinating a paraffin having a molecular size above about $C_{30}$ with the addition of 1.5–4 gram atoms of chlorine per mol of hydrocarbon, dehydrochlorinating the chlorinated product to form olefins, converting the olefins to aldehydes by the oxo-synthesis, hydrogenating the aldehydes to alcohols, forming wax acids from the alcohols by treatment with molten alkali, esterifying 10–50% of the wax acids obtained with a glycol selected from the group consisting of ethylene glycol and butylene glycol, and saponifying 20–80% of the remaining wax acid with a member selected from the group consisting of potassium hydroxide, sodium hydroxide, potassium carbonate and sodium carbonate.

8. Wax according to claim 7, in which said paraffin has a molecular size between about $C_{40}$ and $C_{50}$.

9. Wax according to claim 7, in which said paraffin is a hard paraffin obtained by the catalytic hydrogenation of carbon monoxide.

10. Wax according to claim 7, in which the chlorination is effected with the addition of 1.7–2.2 gram atoms of chlorine per mol of hydrocarbon.

11. Wax according to claim 7, in which about 30–50% of the wax acid is saponified.

12. Wax according to claim 7, in which said paraffin is a hard paraffin obtained from the catalytic hydrogenation of carbon monoxide having a molecular size between about $C_{40}$ and $C_{50}$, said chlorination being effected with the addition of 1.7–2.2 gram atoms of chlorine per mol of hydrocarbon, and in which 30–50% of said wax acid is saponified.

13. In a self-polishing aqueous wax emulsion the improvement which comprises the wax component essentially consisting of a mixture of a free wax acid, alkali soaps thereof and paraffin formed by chlorinating a paraffin having a molecular size above about $C_{30}$ with the addition of 1.5–4 gram atoms of chlorine per mol of hydrocarbon, dehydrochlorinating the chlorinated product to form olefins, converting the olefins to aldehydes by the oxo-synthesis, hydrogenating the aldehydes to alcohols, forming wax acids from the alcohols by treatment with molten alkali, and saponifying 20–80% of the wax acid with a member selected from the group consisting of potassium hydroxide, sodium hydroxide, potassium carbonate and sodium carbonate.

14. A self-polishing aqueous wax emulsion according to claim 13, in which said paraffin is a hard paraffin obtained from the catalytic hydrogenation of carbon monoxide having a molecular size between about $C_{40}$ and $C_{50}$, in which said chlorination is effected with the addition of 1.7–2.2 gram atoms of chlorine per mol of hydrocarbon, and in which 30–50% of said wax acid is saponified.

15. In a self-polishing aqueous wax emulsion, the improvement which comprises the wax component essentially consisting of a mixture of free wax acids, alkali soaps, and esters thereof, and paraffin formed by chlorinating a paraffin having a molecular size above about $C_{30}$ with the addition of 1.5–4 gram atoms of chlorine per mol of hydrocarbon, dehydrochlorinating the chlorinated product to form olefins, converting the olefins to aldehydes by the oxo-synthesis, hydrogenating the aldehydes to alcohols, forming wax acids from the alcohols by treatment with molten alkali, esterifying 10–50% of the wax acids with an alcohol, and saponifying 20–80% of the remaining wax acid with a member selected from the group consisting of potassium hydroxide, sodium hydroxide, potassium carbonate and sodium carbonate.

16. A self-polishing aqueous wax emulsion according to claim 15, in which said paraffin is a hard paraffin obtained from the catalytic hydrogenation of carbon monoxide having a molecular size between about $C_{40}$ and $C_{50}$, in which said chlorination is effected with the addition of 1.7–2.2 gram atoms of chlorine per mol of hydrocarbon, and in which 30–50% of said wax acid is saponified.

17. A process for the production of waxes suitable for forming self-polishing aqueous emulsions, which comprises chlorinating a paraffin having a molecular size above about $C_{30}$ with the addition of 1.5–4 gram atoms of chlorine per mol of hydrocarbon, dehydrochlorinating the chlorinated product to form an olefin-containing mixture, converting the olefins in the mixture to aldehydes by the oxo-synthesis, hydrogenating the aldehydes in the mixture to alcohols, forming wax acids from the alcohols in the mixture by treatment with molten alkali, and saponifying 20–80% of the wax acids in the mixture with a member selected from the group consisting of potassium hydroxide, sodium hydroxide, potassium carbonate and sodium carbonate.

18. Process according to claim 17, in which said paraffin is a hard paraffin obtained from the catalytic hydrogenation of carbon monoxide having an average molecular size between about $C_{40}$ and $C_{50}$, in which said chlorination is effected with the addition of 1.7–2.2 gram atoms of chlorine per mol of hydrocarbon, and in which said 30–50% of said wax acids are saponified.

19. Process according to claim 17, which includes esterifying 10–50% of the wax acids with an alcohol prior to said saponification.

20. Process according to claim 19, in which said paraffin is a hard paraffin obtained from the catalytic hydrogenation of carbon monoxide having an average molecular size between about $C_{40}$ and $C_{50}$, in which said chlorination is effected with the addition of 1.7–2.2 gram atoms of chlorine per mol of hydrocarbon, and in which said 30–50% of said wax acids are saponified.

References Cited in the file of this patent

UNITED STATES PATENTS

| | | |
|---|---|---|
| 2,010,297 | Flaxman | Aug. 6, 1935 |
| 2,109,842 | Harris | Mar. 1, 1938 |